Patented Aug. 30, 1938

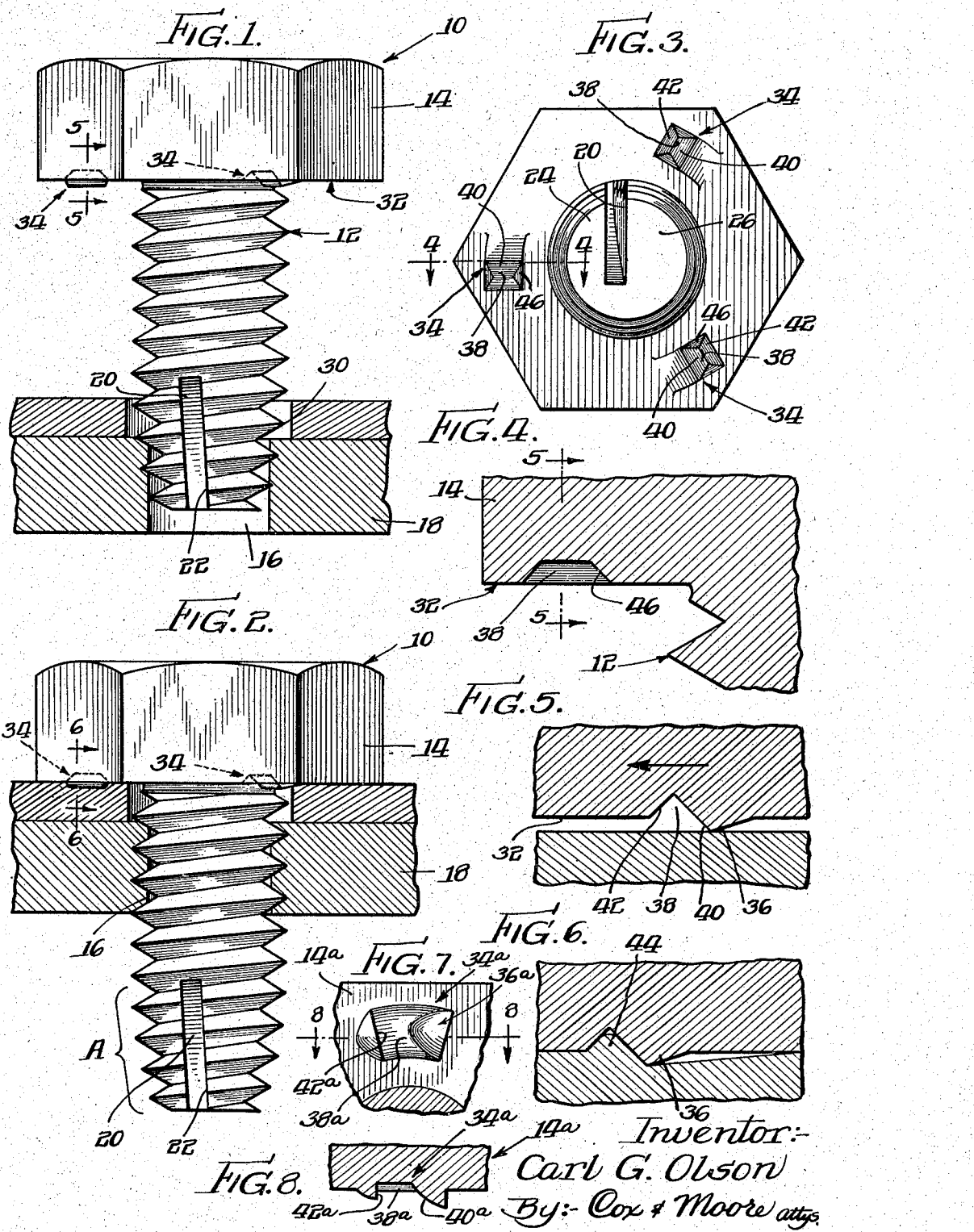

2,128,757

UNITED STATES PATENT OFFICE 2,128,757

MEANS FOR FASTENING

Carl G. Olson, Chicago, Ill., assignor to Illinois Tool Works, Chicago, Ill., a corporation of Illinois Application May 29, 1936, Serial No. 82,387

7 Claims. (Cl. 151—32)

This invention relates generally to means for fastening metallic parts, and more particularly to means whereby an internal thread may be formed by a fastening element, said element being subsequently secured against retrograde movement after the thread-forming operation has been completed.

It is one of the important objects of the present invention to provide methods and means whereby parts may be firmly secured together in a very expeditious manner, and to this end I propose to form an internal thread or helical path in an unthreaded aperture in at least one of the work pieces by a fastener element and subsequently employ the thread or helical path so formed to cooperate in causing a shifting or flowing of metal of the work into the confines of the fastener body when rotary tightening movement is experienced thereby.

More specifically, my invention contemplates rotating a threaded fastener body and initially applying axial pressure thereto sufficient to cause said threaded body to start an internal thread within the work, and upon completing said threading operation, to cause portions of the metal of the work positioned laterally outward from the threaded body to be crowded into the confines of the fastener body which is adapted to be clamped against the surface of the work and thereby secure the fastener against loosening.

It is a further object of my invention to provide an improved self-locking threaded fastener having locking sections associated with the clamping surface thereof which are of the type adapted to be conveniently formed by practicing simple shop methods, and which are so disposed along the clamping surface as to effectively crowd metal of the work into the confines of the fastener when said fastener is subjected to rotation in a tightening direction.

The foregoing and other objects will be more apparent from the detailed description which is to follow, when considered in connection with the accompanying drawing, wherein:

Figure 1 is an elevational view disclosing a threaded fastener of the type contemplated by the present invention partially inserted within the work;

Figure 2 discloses said fastener after the self-threading operation has been completed and the thread thus formed has cooperated with the complementary thread of the fastener in causing material of the work to be shifted or crowded into the confines of the body of the fastener positioned laterally outward from the threaded portion thereof;

Figure 3 is a view of the fastener shown in Figure 1 taken from the bottom with the work removed so as to more clearly illustrate the arrangement of the locking sections associated with the clamping surface of the fastener;

Figure 4 is an enlarged fragmentary sectional view taken substantially along the line 4—4 of Figure 3 in the vicinity of the junction of the head and threaded body of the fastener;

Figure 5 is an enlarged fragmentary sectional view taken substantially along the line 5—5 of Figure 1, disclosing one of the locking sections initially engaging the surface of the work;

Figure 6 illustrates the cold flowing or crowding action which takes place when the fastener body is rotated in a tightening direction, said view being taken substantially along the line 6—6 of Figure 2;

Figure 7 is a fragmentary view similar to Figure 3, disclosing the under side of a screw head provided with a locking section of modified form; and Figure 8 is a sectional view of the modified locking section, taken substantially along the line 8—8 of Figure 7.

Referring to the drawing, it will be seen that I have employed like numerals to designate similar parts throughout the various figures. One embodiment of the invention whereby my improved method of fastening may be practiced comprises a fastener, designated generally by the numeral 10. The fastener 10 includes a threaded shank or body 12 and an enlarged body portion or head 14 provided at one end thereof. The thread on the entering or opposite end of the threaded body 12 decreases in external diameter so as to facilitate the application of the fastener to an unthreaded aperture 16 in a work piece 18. I prefer to designate this tapering or entering end of the body 12 by the letter A. This portion A may correctly be referred to as the thread-forming or tapping portion because this portion of the body functions to form an internal thread in the work piece 18.

I prefer to form the internal thread or helical path within the work 18 by a cutting operation, and to accomplish this I provide the entering portion A of the body 12 with a longitudinal recess 20. Thus when the entering end A is initially inserted within the unthreaded aperture of the work 18 and sufficient axial and rotative force is applied thereto, the serrated cutting edge 22 presented at one side of the recess 20 actually cuts material out of the work piece to form an internal helical path or thread therein. To further facilitate this tapping operation, I offset the recess 20, as clearly indicated in Figure 3, thereby enabling a section 24 of the threaded body 12 to yield toward an opposite section 26 and thus increase the cutting effectiveness of the serrated edge 22. My invention, however, is not limited to the feature of forming a helical path or thread in the work by a cutting operation, but contemplates other methods whereby the thread forming operation may be practiced. The invention contemplates helical thread-forming elements or threads which toward the entering end decrease in external diameter to facilitate initial entry within the work.

For purposes of illustration I have disclosed a work piece 28 provided with a clearance hole 30 through which the body or shank may freely pass. The aperture 16 is of a diameter which will permit the forming of a helical path or thread in the work 18 in response to the rotary force applied to the body portion or head 14. By practicing the step of cutting material away to produce the helical path, as distinguished from embedding or cold flowing, I am able to employ smaller apertures in relatively thick stock. In other words, I am able to increase the thread bite as compared with threaded body portions or shanks of the type not equipped with a cutting edge.

In practicing my improved method of fastening, the aperture 16 and the clearance aperture 30 are first formed in the work. The entering or smaller extremity of the threaded shank 12 is then inserted within the aperture 16 and both rotative and axial force applied to the head 14 by means of any suitable turning tool or driver (not shown). A helical path or thread is thus formed in the work 18 which corresponds with the helical element or thread on the shank 12, and after the thread forming or cutting operation in the work 18 has been completed, continued rotation causes a clamping surface 32 of the head 14 to approach the outer surface of the work 28.

As this clamping surface 32 approaches the surface of the work 28, three locking sections—designated generally by the numeral 34—which are equally spaced from each other 120 degrees, are moved into operative association with the surface of the work 28. In this connection reference is made to applicant's issued patent, No. 2,037,586, issued April 14, 1936. These locking sections each include a metal shifting or flowing element or projection 36 which extends axially beyond the clamping surface 32, see particularly Figure 5. This element 36 is provided when an indentation or recess 38 is formed within the body or head 14. During the indenting operation, the metal of the head 14 is shifted so as to produce the projection 36. The surface at the front or advancing side of the projection 36 I have designated by the numeral 40, and another trailing or abutment surface I have designated by the numeral 42. Thus as the final tightening rotation is imparted to the head 14 so as to move the work shifting projections or elements 36 from the position shown in Figure 5 to the position shown in Figure 6, the coaction between the thread or helical path, previously formed in the work 18 by the entering end of the shank 12, with the complementary thread or helical element on said shank causes axial movement to be experienced by the element 36. This axial movement coupled with the rotary force applied to the head 14 causes sections of the work surface to be shifted or crowded into the confines of the body or head 14, as clearly indicated in Figure 6.

These shifted work sections are designated by the numeral 44, Figure 6, and it will be seen that they are crowded within the recess 38 so as to present a substantially rigid unsevered mass. By causing the sections 44 to be shifted into locking association with the surfaces 42, and by having a perfect thread fit between the shank 12 and the work 18, a very firm fastening of the parts is effected. In addition, the clamping engagement of the surface 32 with the work piece 28 cooperates in resisting any tendency to impart retrograde rotation to the fastener device. Thus the perfect thread fit between the thread on the shank 12 and the work 18 serves to prevent lateral shifting of the shank and screw head and thereby cooperates with the locking sections in securing the fastener against loosening. In other words, the threaded shank in forming its complementary thread in the work insures a perfect fit, and this perfect fit renders the locking sections 34 more efficiently operable in securing the fastener against loosening.

The thread on the shank 12 is preferably rolled and the head 14 is preferably produced in a machine commonly known as a "header" (not shown). This header is designed to upset the end of a piece of round stock so as to produce the desired shape of head. I prefer to form the locking sections 34 during the heading operation. Thus as the head is being shaped in a suitable die, I engage the clamping surfaces 32 with a punching device (not shown) which represents a counterpart of the locking sections 34 and the associated clamping surface 32. In this connection it is important to note that all of the walls which bound the recess 38, two of said walls being the surfaces 40 and 42 herebefore referred to, are inclined so as to facilitate the withdrawal of the punch element after the punching operation has been completed. I wish to call particular attention to the wall surfaces 46 bounding the inner side of each recess 38. This wall surface 46 is inclined to the clamping surface 32. When the punch element forces its way into the body or head 14 it causes compression of the material. Obviously, compression of the metal takes place both radially and circumferentially. Unless the surface 46 is inclined or relieved, the compression of the metal in this vicinity, caused during the punching operation, will interfere with the withdrawal of the punch. Furthermore, when the head 14 is being formed by upsetting the end of round stock, the material immediately to the right of the recess 38, as shown in Figure 4, flows radially. Therefore, if the indenting tool or punch employed in the making of the recess 38 operates simultaneously with the head forming operation, the radial flowing of the metal in the head would have a tendency to cause the tool to be gripped, were it not for the presence of the inclined surface 46. In other words, the surface 46 prevents the lateral or radial flowing of the material in the head to set up a binding or frictional contact with the indenting tool, and thereby facilitates the withdrawal of the tool and prevents breaking of the tool. These lateral forces set up during the heading operation are very great and have a tendency to fracture the indenting tool.

In order to render the device 10 suitable for practicing the method of securing relatively hard metals, such as soft iron and soft steel, the thread-forming portion as well as the locking sections 34 must be hardened. Thus if the helical way or thread is to be produced in a piece of steel, the steel of the thread-forming portions must be hardened to enable a thread to be formed or cut within the work. Likewise if the work piece 28 is made of steel, the locking sections must be hardened to enable the above described shifting of the work sections. Auxiliary fastening devices, such as lock washers, have been effectively employed to secure unhardened clamping or fastener elements, such as screw heads or nuts, against loosening. However, in instances where fasteners of the self-tapping variety are employed, lock washers can not be used because such fasteners are normally case hardened. Hence the present invention particularly lends itself for use in environments where it is desirable to dispense with the use of the conventional tap. My improved method of fastening not only eliminates the step of employing a tap before applying a screw fastener but also eliminates the step of applying to a threaded fastener some auxiliary fastening device such as a lock washer. By eliminating these two steps my invention reduces to a minimum the time and effort required for positively securing metallic parts together. Furthermore, the fastening which results from the practice of my invention is positively secure against vibrations or other forces which might otherwise have a tendency to loosen the fastening.

In Figures 7 and 8 I have disclosed locking sections 34a of modified form. These sections 34a include a circumferential indentation or recess 38a, the bottom of which is curved to facilitate withdrawal of the indenting tool or punch. A projection 36a provided with a surface 40a serves to shift metal into the recess 38a in response to the tightening rotary movement of the head 14a, shown fragmentarily in Figures 7 and 8. A complementary trailing or abutment surface 42a functions similarly to the surface 42 previously described.

It should also be understood that the helix or thread angle of the thread on the shank 12 may be varied, and likewise the form of thread, to suit the particular needs incident to its use. I have found that the thread conforming with a standard machine screw thread functions satisfactorily. By employing a thread having a relatively small helix angle, or in other words a thread having a relatively small lead, my method of fastening can be more efficiently practiced. In other words, the efficiency with which the final axial shifting of the elements 36 takes place is dependent upon the coaction between the thread on the shank and the complementary thread previously formed by it in the work. By thus forming or cutting the thread in the work, the possibility of backlash or clearance between the complementary threads of the shank and the work is completely obviated and the drawing in of the fastener resulting from the coaction of said threads during the final rotation thereof, produces a fastening of superior quality.

My invention also presents the advantage of being able to simultaneously harden the part which does the locking, namely, the locking section in the screw head, and the part which does the thread-forming, namely, the helical element or thread on the shank. Thus my invention contemplates methods whereby the thread-forming and locking may be practiced contemporaneously, and further contemplates fastening devices comprising a hardened unitary locking and thread-forming structure.

Obviously the invention is not limited to the specific form of thread or locking section disclosed herein but is capable of other modifications and changes without departing from the spirit and scope of the appended claims.

For purposes of illustration, I have somewhat exaggerated the degree to which the work shifting element projects beyond the clamping surface, particularly in Figures 5 to 8, inclusive. In practice I have found that under certain circumstances the degree to which the work shifting element need extend beyond the clamping surface is relatively small. Hence it will be understood that the structure disclosed herein is only illustrative and that the invention is by no means limited to the specific sizes or shapes shown in the drawing.

Having thus described the invention, what I claim as new and desire to secure by Letters Patent is:

1. A self-locking thread-forming fastener including a threaded shank, said shank having a holding portion and a hardened thread-forming portion at one extremity, the thread on said thread-forming portion diminishing in external diameter toward the entering end to facilitate application to an unthreaded aperture in the work, a head provided at the opposite extremity of said shank, and a locking section associated with the under side of said head, said locking section including an abutment section and a hardened element adapted in response to rotary tightening movement experienced by the head and shank to cause a section of the work piece positioned laterally outward from said shank to be shifted into locking association with said abutment section whereby to prevent loosening of the fastener, the thread on said shank being so disposed that when final rotary movement is experienced by said head the thread previously formed in the work by said shank will coact with the complementary thread on said shank in causing axial movement to be experienced by said locking section.

2. A self-locking thread-forming fastener including a threaded shank, said shank having a holding portion and a hardened thread-forming portion at one extremity, the thread on said thread-forming portion diminishing in external diameter toward the entering end to facilitate application to an unthreaded aperture in the work, a recess traversing the thread on said thread-forming portion to enable the actual cutting of a complementary thread in the work piece, a head provided at the opposite extremity of said shank, and a locking section associated with the under side of said head, said locking section including an abutment section and a hardened element adapted in response to rotary tightening movement experienced by the head and shank to cause a section of the work piece positioned laterally outward from said shank to be shifted into locking association with said abutment section whereby to prevent loosening of the fastener, the thread on said shank being so disposed that when final rotary movement is experienced by said head the thread previously formed in the work by said shank will coact with the complementary thread on said shank in causing axial movement to be experienced by said locking section.

3. A self-locking thread-forming fastener including a threaded shank, said shank having a holding portion and a hardened thread-forming portion at one extremity, the thread on said thread-forming portion diminishing in external diameter toward the entering end to facilitate application to an unthreaded aperture in the work, a head provided at the opposite extremity of said shank, and a locking section associated with the under side of said head, said locking section including an indentation and a hardened element adapted in response to rotary tightening movement experienced by the head and shank to cause a section of the work piece positioned laterally outward from said shank to be crowded into said indentation whereby to prevent loosening of the fastener, the thread on said shank being so disposed that when final rotary movement is experienced by said head the thread previously formed in the work by said shank will coact with the complementary thread on said shank in causing axial movement to be experienced by said locking section.

4. A rotary fastener adapted to be clamped against the surface of a work piece, including a rotary threaded body, and circumferentially spaced locking sections on said body, each locking section including an abutment section and an element adapted in response to rotary tightening movement experienced by the body to cause a section of the work piece positioned laterally outward of the threaded portion of the body to be shifted into locking association with said abutment section whereby to prevent loosening of the fastening, said locking sections being spaced sufficiently to enable rotation of the body through more than 90° after initial contact of said element with the work piece without destroying the locking effect of said locking sections.

5. A rotary fastener having a surface adapted to be clamped against the surface of a work piece, including a rotory threaded body, and a plurality of locking sections of said body, each locking section including an indentation surrounded by wall sections inclined with respect to the clamping surface of the fastener and an element projecting beyond said clamping surface and adapted in response to rotary tightening movement experienced by the body to cause a section of the work piece positioned laterally outward of the threaded portion of the body to be crowded into said indentations whereby to prevent loosening of the fastener.

6. A rotary fastener having a surface adapted to be clamped against the surface of a work piece, including a rotary threaded body, and a plurality of locking sections on said body, each locking section including an indentation surrounded by converging wall sections inclined with respect to the clamping surface of the fastener and an element projecting beyond said clamping surface and adapted in response to rotary tightening movement experienced by the body to cause a section of the work piece positioned laterally outward of the threaded portion of the body to be crowded into said indentations whereby to prevent loosening of the fastener.

7. A rotary fastener having a surface adapted to be clamped against the surface of a work piece, including a rotary threaded body, and a plurality of locking sections on said body, each locking section including an indentation, the inner portion of said indentations being bounded by a wall surface of the body, said wall surface diverging from the threaded portion of the fastener as it extends into the body of the fastener, and an element projecting beyond said clamping surface and adapted in response to rotary tightening movement experienced by the body to cause a section of the work piece positioned laterally outward of the threaded portion of the body to be crowded into said indentations whereby to prevent loosening of the fastener.

CARL G. OLSON.